United States Patent [19]

Kamoshita

[11] Patent Number: 5,149,599
[45] Date of Patent: Sep. 22, 1992

[54] METHOD OF STOPPING THE OPERATION OF PHOSPHORIC ACID TYPE FUEL CELL

[75] Inventor: Tomoyoshi Kamoshita, Kawasaki, Japan

[73] Assignee: Fuji Electric Co., Ltd., Kanagawa, Japan

[21] Appl. No.: 584,770

[22] Filed: Sep. 19, 1990

[30] Foreign Application Priority Data

Sep. 20, 1989 [JP] Japan .................. 1-243685

[51] Int. Cl.$^5$ .............................. H01M 8/04
[52] U.S. Cl. .......................... 429/13; 429/49
[58] Field of Search ....................... 429/13, 49

[56] References Cited

U.S. PATENT DOCUMENTS

| 4,294,892 | 10/1981 | Alfenaar ................. 429/13 |
| 4,555,452 | 11/1985 | Kahara et al. ........... 429/13 |
| 4,810,594 | 3/1989 | Bregoli et al. .......... 429/13 |

FOREIGN PATENT DOCUMENTS 62-82660 4/1987 Japan .

Primary Examiner—Stephen Kalafut
Attorney, Agent, or Firm—Spencer, Frank & Schneider

[57] ABSTRACT

When the operation of a fuel cell using phosphoric acid as an electrolyte is stopped, the concentration of phosphoric acid is decreased to thereby lower crystallization temperature of the electrolyte and at the same time reactive gas remaining inside the main body of the fuel cell is replaced by an inert gas.

6 Claims, 3 Drawing Sheets

METHOD OF STOPPING THE OPERATION OF PHOSPHORIC ACID TYPE FUEL CELL

BACKGROUND OF THE INVENTION

1. Field of the Invention

The present invention relates to a method of stopping the operation of a phosphoric acid fuel cell using phosphoric acid as an electrolyte. More particularly, the present invention relates to a method of stopping the operation of a phosphoric acid fuel cell which can prevent crystallization of electrolyte when its operation is stopped without using any heating means and which enables the replacement of an atmosphere inside a main body of the fuel cell by a non-combustible gas without difficulty.

2. Description of the Prior Art

As is well known, fuel cells include a stack constructed by a plurality of unit cells stacked one on another which are each composed of a matrix carrying an electrolyte, and a pair of electrodes, i.e., a fuel electrode and an oxidizer electrode, that sandwich the matrix between them, and generate electricity by supplying a fuel gas containing hydrogen and an oxidizer composed of air or oxygen to the stack. The fuel cells include various types: ones which are classified into a phosphoric acid fuel cell, an alkali fuel cell, and a molten carbonate type fuel cell depending on the electrolyte and working temperature used. For the sake of safety, it has hitherto been a common practice to conduct gas replacement operations in which gases retained in supply and discharge lines for supplying and discharging fuel gas, respectively, inclusive of the main body of a fuel cell itself, are replaced with an inert gas such as nitrogen gas at the time of starting or stopping (inclusive of emergency stopping) of the operation of fuel cells. More particularly, in the case of starting from the fuel cells being in a stop mode, generally air or oxygen remains in fuel lines inside the fuel cell and if a hydrogen-rich fuel gas was supplied to the fuel lines in that state there would be a danger that an explosive gas mixture could be formed and there could occur an explosion. On the contrary, when the operation of the fuel cell is to be stopped, if the fuel cell was left to stand in such a state that some fuel gas remains inside the main body of the fuel cell, the pressure of the fuel gas could decrease due to internal discharge or variation of temperature to induce penetration of air from outside the system to the side of fuel, resulting in that there would be a danger that an explosive gas mixture could be formed. Therefore, the gas replacement operation is carried out in order to obviate the danger.

Conventionally, power generation has been achieved by retaining a state in which the matrix layer in the phosphoric acid fuel cell contains or carries phosphoric acid as an electrolyte in a concentration of near 100% by weight. However, when the temperature of the main body of the fuel cell decreases to a level of no higher than about 40° C. after the stopping, the phosphoric acid in a liquid state begins to deposit as crystals, i.e., a so-called crystallization of liquid phosphoric acid occurs. If the crystallization occurs, crystallized phosphoric acid will due to its thermal stress impair the electrodes or give rise to damages such as deterioration of the water-repellent property of the electric base materials. This problem is particularly serious because the fuel cells could often be exposed to a low temperature as low as several tens of degrees below zero depending on environmental conditions of the place where they are arranged. Accordingly, a process has hitherto been used in which heating means such as an electric heater is provided with the main body of the fuel cell or its cooling means in order to heat the main body of the fuel cell to a temperature no lower than the above-described crystallization temperature while the operation is stopped. However, this process is disadvantageous in that it is uneconomical because power is wasted while the operation is being stopped. Another disadvantage of the process is that the process requires a mobile power source for heating when the fuel cell is designed so as to serve as a power source installment for movement and as a result area for movement or travelling is limited.

On the other hand, in the conventional fuel cell installments, it is necessary to provide a storage tank such as pressure bomb for storing and controlling an inert gas besides the lines for fuel and oxidizer, and supply it from the storage tank to a gas reaction line of the fuel cell whenever the operation of the fuel cell is to be started or stopped. The conventional system is disadvantageous in that in addition to the management of fuel, troublesome, time-taking management is always necessary which includes, for example, monitoring the amount of gas remaining in the storage tank for the inert gas, securing stock gas inclusive of spare gas and purchasing or procuring the inert gas. Particularly in the case of mobile power source installments, provision of a large storage tank is required for storing the inert gas, which is disadvantageous in that the installments must necessarily be of a large scale.

SUMMARY OF THE INVENTION

An object of the present invention is to provide a method of stopping the operation of a fuel cell which does not need heating means while the operation is being stopped but makes it possible to easily replace a gas in a main body of the fuel cell by an inert gas.

In order to achieve the object, the present invention is constructed as follows. That is, the present invention provides a method of stopping an operation of a phosphoric acid fuel cell having a matrix type main body including a fuel electrode and an air electrode and containing phosphoric acid as an electrolyte, a fuel gas containing a combustible component, a fuel gas circulation line for circulating the fuel gas and including the fuel electrode, a closable air inlet and connected to the fuel gas circulation line for taking up air a closable fuel gas supply and discharge line for supplying the fuel gas to the fuel electrode and discharging the fuel gas from the fuel electrode, and a reaction air supply and discharge line for supplying reaction air to the air electrode. The method comprises the steps of interrupting a load of said fuel cell, supplying air from said air inlet while circulating gas in said fuel electrode to said fuel gas circulation line and decreasing concentration of the electrolyte with water resulting from an electrode catalyst reaction occurring in said main body of said fuel cell, closing said fuel gas circulation line on its discharge side to consume said combustible component in said gas circulating in said fuel circulation line due to said electrode catalyst reaction, and decreasing the concentration of said combustible component in said fuel electrode and of said electrolyte, to predetermined respective, levels.

In another aspect, the present invention provides a method of stopping an operation of a phosphoric acid fuel cell having a matrix type main body including a fuel electrode and an air electrode and containing phosphoric acid as an electrolyte, a fuel gas containing a combustible component, a fuel gas circulation line for circulating the fuel gas and including the fuel electrode and a circulation blower, a closable fuel gas supply and discharge line for supplying the fuel gas to the fuel electrode and discharging the fuel gas from the fuel electrode, and a reaction air supply and discharge line for supplying reaction air to the air electrode. The method comprises the steps of interrupting a load of said fuel cell and connecting a discharge resistor thereto, continuing a power generation reaction while circulating said fuel gas to be supplied to said fuel electrode to said fuel gas circulation line, decreasing concentration of the electrolyte with water resulting in said air electrode due to said power generation reaction, closing said fuel gas circulation line on its discharge side to consume said combustible component in said gas circulating in said fuel circulation line due to said electrode catalyst reaction, and decreasing the concentration of said combustible component in said fuel electrode and of said electrolyte, to predetermined respective levels.

In each of the above-described methods, the predetermined levels of the concentrations of the electrolytes must satisfy conditions that they are concretely in a range of from 91 to 63% by weight, and such that phosphoric acid will not crystallize at a predetermined minimum ambient temperature, and the predetermined level of the concentration of the combustible component of the fuel gas is no higher than 4% by volume.

According to the present invention, the provision of the step of decreasing the concentration of phosphoric acid which serves as an electrolyte with water produced in the catalytic combustion reaction of the main body of the fuel cell itself or power generation reaction while the operation of the fuel cell is being stopped and of the step of decreasing the content of the combustible gas component and replacing the combustible gas by an inert gas makes it possible to stop the operation of the fuel cell safely without using inert gases which have hitherto been used in the conventional methods and further makes it unnecessary to use a heater for the heat retention of the fuel cell while its operation is being stopped and also power which would otherwise be consumed by the heater.

In addition, particularly in a fuel cell power generator for automobile vehicles, it is unnecessary to provide a large storage tank for storing an inert gas so that the device can be made compact and to manage the inert gas, resulting in that management of the operation of the device can be simplified. In addition, no consumption of inert gases gives rise to an advantage that running cost can be decreased.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
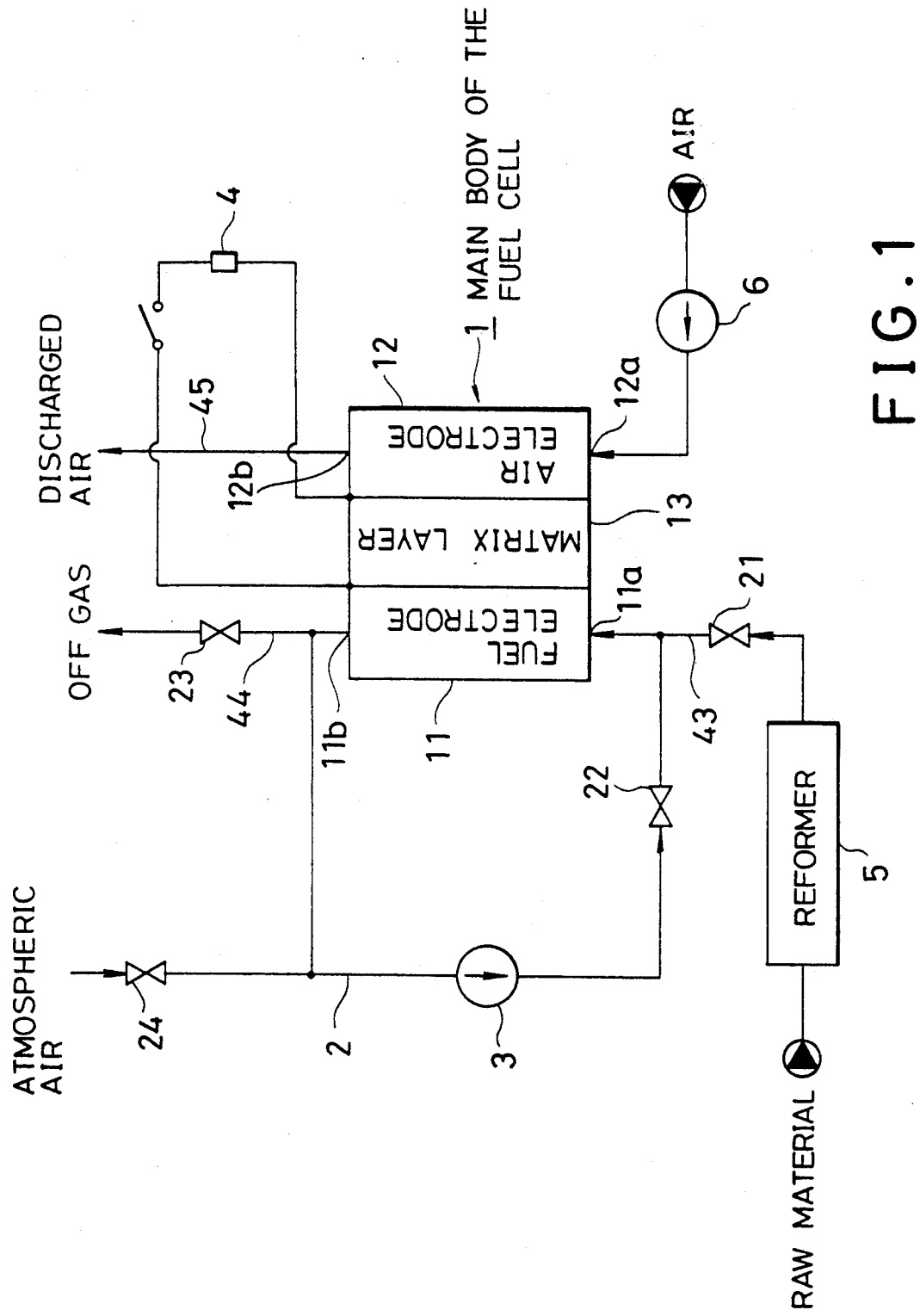
FIG. 1 is a block diagram showing a supply and discharge line for a reaction gas used in a fuel cell generator practicing the method of stopping an operation of fuel cell according to an embodiment of the present invention.

The method of the present invention is constructed in view of the fact that the crystallization temperature of an aqueous solution of phosphoric acid can be decreased from about 29° C. down to about −85° C. by decreasing the concentration of its concentration from about 90% by weight down to about 63% by weight. More specifically, hydrogen contained in the fuel gas to be supplied to the fuel gas circulation line including the fuel electrode and oxygen contained in the reaction air are directly reacted by an electrode catalyst activity of the fuel electrode to produce water and the resulting water is absorbed by phosphoric acid, which has high water absorption properties to decrease the concentration of the aqueous solution of phosphoric acid to a level in a predetermined range. By this construction, damage of fuel cell which would otherwise occur due to the crystallization of phosphoric acid when ambient temperature is lowered can be prevented effectively without using a heater or the like for heating.

Also, the present invention is constructed based on the fact that when the gas in the fuel electrode is circulated with stopping the supply and discharge of the fuel gas after lapse of a predetermined time, air to be used for the consumption of hydrogen is supplied from the air intake inlet. This decreases the content of the combustible gas component which is present in the fuel gas circulation line so that the concentration of hydrogen can be decreased with ease to a level no higher than 4% by volume which is an explosion limit concentration of hydrogen, with the result that gas replacement for replacing the gas in the fuel gas circulation line including the fuel electrode by an inert gas can be carried out without using a pressure bomb for storing the inert gas such as a nitrogen gas bomb.

In the method of the present invention, water produced during the gas replacement is circulated in the fuel gas circulation line while retaining its high vapor pressure to thereby promote the decrease of the concentration of the aqueous solution of phosphoric acid based on a principle of phase equilibrium.

Furthermore, in the method of the present invention, the concentration of phosphoric acid can be decreased by switching the load to a discharge resistor, continuing the power generation reaction and absorbing water produced on the side of the air electrode by phosphoric acid. After continuing the above-described steps for a predetermined period of time, the discharge side of the fuel gas supply and discharge line is closed to cause hydrogen in the circulating gas to be consumed by the power generation reaction. This can decrease the concentration of hydrogen on the side of the fuel electrode side to a value no higher than a predetermined level.

The present invention will be described in greater detail with reference to the following specific embodiments which are presented by way of example and should be construed in no way as limiting the invention thereto.

Embodiment 1

FIG. 1 is a block diagram of a supply and discharge line or system for a reaction gas used in a fuel cell generator practicing the method of stopping an operation of a fuel cell according to an embodiment of the present invention. In FIG. 1, reference numeral 1 denotes a main body of a phosphoric acid type fuel cell illustrated schematically. The main body of the fuel cell includes a pair of electrodes, i.e., a fuel electrode 11 and an air electrode 12, and a matrix 13 which carries as impregnated therein an electrolyte. The fuel electrode 11 and the air electrode 12 sandwich the matrix 13 therebetween. The fuel electrode 11 has an inlet 11a and an outlet 11b for the supply and discharge, respectively, of a fuel gas which typically contains hydrogen as a combustible gas component. A fuel gas circulation blower 3 is connected to the main body 1 so as to connect the inlet and outlet and through a valve 22 arranged between the circulation blower 3 and the inlet 11a to constitute a fuel gas circulation line or system 2. The fuel gas circulation line or system 2 is provided with an air inlet 24 composed of a valve for introducing air, one end of which opens in the atmospheric air. In addition, a fuel gas supply line or system 43 for supplying the fuel gas to the fuel electrode 11 is provided. The line or system 43 is constituted by a reformer 5 which is connected to the inlet side of the fuel electrode 11 through a valve 21. To the outlet side of the reformer 5 is connected a discharge line or system 44 for discharging an off gas which line includes a valve 23. The reformer 5 converts raw material composed of a raw fuel such as natural gas or methanol and water into a hydrogen-rich fuel gas, and when the fuel cell is operated, the reformer 5 supplies the fuel gas to the fuel electrode 11 of the main body 1 of the fuel cell by opening the valve 21. On the other hand, the air electrode 12 of the main body 1 of the fuel cell is provided with a reaction air supply and discharge line or system 45 for supplying air for reaction through an air blower 6. The air electrode 12 has an inlet 12a and an outlet 12b and air from the air blower 6 is introduced in the air electrode 12 through the inlet 12a and air after reaction is discharged to the atmospheric air through the outlet 12b.

In the above-described construction, the valves 22 and 24 are closed and the circulation blower 3 is stopped during the power generation of the fuel cell, and the fuel gas is supplied to the fuel electrode 11 in the main body 1 of the fuel cell from the reformer 5 through the valve 21 while air is supplied to the air electrode 12 of in the main body 1 of the fuel cell from the air blower 6, and as a result the fuel cell generates electric power and supplies it to a load 4, for example.

Next, explanation will be made on an operation of stopping the operation of the fuel cell, i.e., an operation of switching the state of the fuel cell from the above-described power generation mode to a stop mode. When the operation of the fuel cell is to be stopped, at first the load 4 outside is interrupted from the cell and then the valve 22 is opened and the fuel gas circulation blower 3 is actuated to circulate the fuel gas in the fuel electrode 11 in the fuel gas circulation line or system 2. In this state, the valve 24 is opened. As a result, air is introduced in the fuel gas circulation line or system 2 through the valve 24 in an amount which depends on a difference in pressure between the atmospheric pressure and a suction pressure of the blower 3 and on a fluid resistance of the valve 24. The fuel gas and air come in contact with each other on the electrode catalyst of the fuel electrode 11 of the main body of the fuel cell where the combustible gas component in the fuel gas reacts catalytically with oxygen in the air introduced to produce water. The water thus produced is mainly discharged out of the fuel cell through the valve 23 as a part of off gas but a portion thereof is fed back to the circulation line or system 2 and thus supplied to the fuel cell again. When this mode of operation is continued, the ratio of water in the gas circulating in the circulation line or system 2 increases and phosphoric acid which serves as an electrolyte carried by the matrix in the main body 1 of the fuel cell absorbs the moisture from the gas circulating in the circulation line or system 2 so that the concentration of phosphoric acid therein decreases. The degree of moisture absorption by phosphoric acid depends on the temperature of the main body, and it decreases to a greater extent while the operation of the fuel cell is stopped because the temperature of the main body of the fuel cell decreases when the cell is in a stop mode.

Then, after retaining the above-described state for a predetermined time, the valves 21 and 23 are closed to stop the supply of the fuel gas to be supplied to the fuel electrode 11 and the discharge of the off gas to be discharged from the fuel electrode 11 so that the fuel gas is circulated in the circulation line or system 2. In this state, all the water produced is circulated in the circulation line so that the degree of moisture absorption by phosphoric acid as an electrolyte increases further to decrease the concentration of phosphoric acid. Due to reaction: $2H_2 + O_2 = 2H_2O$ the volume of the gas circulating in the fuel gas circulation line or system decreases after the reaction and this decrease in volume gives rise to decrease in pressure relative to atmospheric pressure accordingly. As a result, air is caused to flow in from the atmospheric air into the fuel gas circulation line or system such that the amount of oxygen in the air corresponds to the amount of the combustible gas component which reacted. The flow rate of air is determined depending on the difference in pressure between the atmospheric air and the fuel gas circulation line or system and on the fluid resistance of the air inlet.

Therefore, in either one of the above-described operations, the higher the fluid resistance, the lesser will the flow rate of air be. This makes it possible to readily lower the partial pressure of oxygen in the combustible gas to a level of no higher than 4% by volume, which is an explosion limit. Also, it is possible to control reacting weight per unit time and hence calorific value so that if a cooling mechanism (not shown) for cooling the main body of the fuel cell is actuated, the heat generated can be removed with ease to thereby retain the temperature of the main body of the fuel cell at a temperature no higher than a predetermined allowable value. Furthermore, after the combustible gas in the fuel gas circulation line or system has been consumed as a result of reaction, no air flows in from the air inlet so that the gas composition in the fuel gas circulation line or system at this point in time is composed of noncombustible gases such as carbon dioxide and the like derived from the fuel gas and nitrogen derived from the air taken up from the atmospheric air. If the operation of the gas replacement of the fuel electrode is completed at this point in time and the circulation blower 3 is stopped and the valves 22 and 24 are closed, the fuel electrode is sealed with the inert gas or gases.

Figure 2:
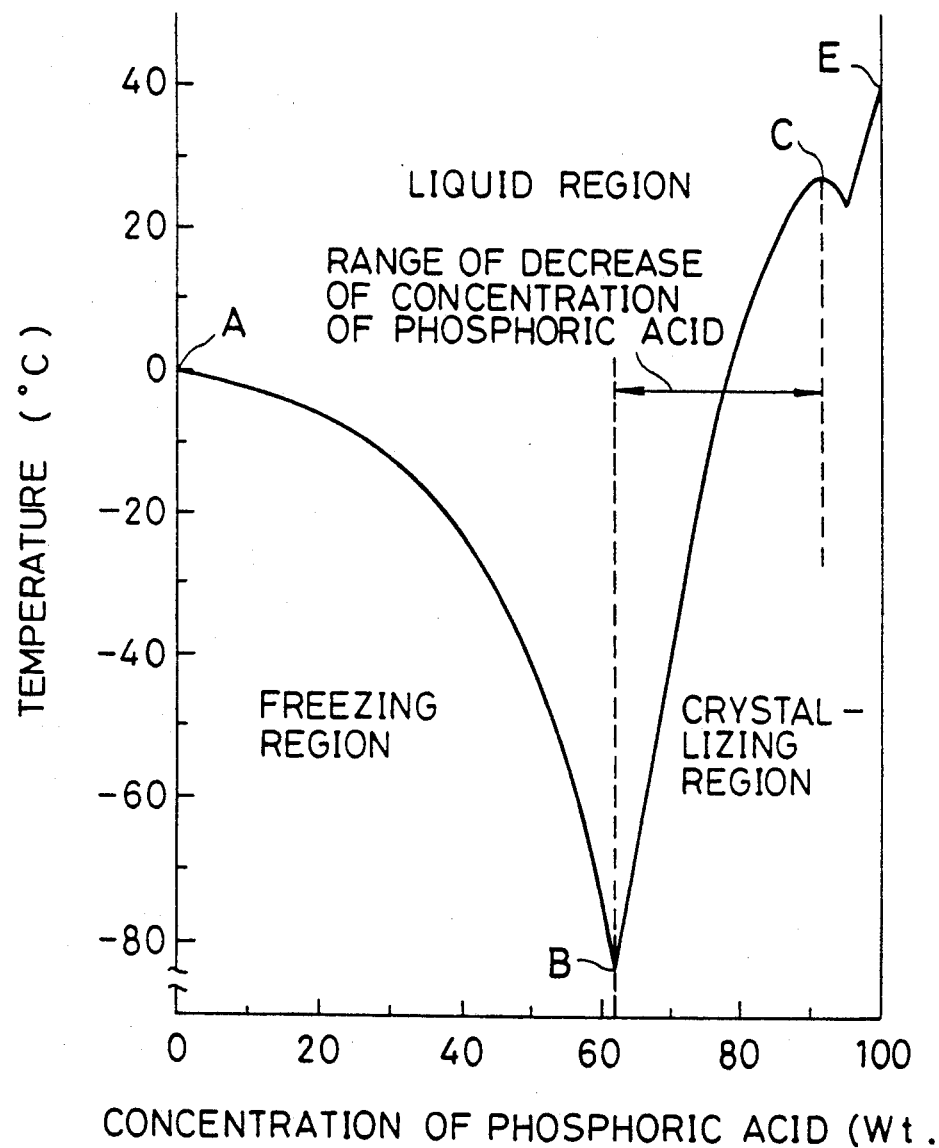
FIG. 2 is a graph illustrating a characteristic curve plotting a phosphoric acid concentration versus crystallization temperature.

FIG. 2 is a graph representing a characteristic curve plotting a phosphoric acid concentration versus crystallization temperature, which shows a range within which the concentration of phosphoric acid decreases according to this embodiment. In FIG. 2, the curve plotting the concentration of aqueous solution of phosphoric acid versus crystallization or freezing temperature shows characteristics of a substantially V-shaped curve with a its lower limit value being $-85°$ C. at a concentration of 62.5% by weight (point B). In a region of a concentration lower than 62.5% by weight (i.e., a range between point B and point A), the water in the solution freezes to increase the freezing temperature of the solution, and in a region of a concentration higher than 62.5% by weight (i.e., in a range between point B and point E), crystals of phosphoric acid deposit to increase the crystallization temperature of the solution. Hence, if the concentration of phosphoric acid impregnated in the matrix layer 13 in the main body of the fuel cell is decreased to a value which is in a range of decrease between point B in FIG. 2 (62.5% by weight) and point C in FIG. 2 (91.6% by weight) and no higher than a predetermined temperature corresponding to the lowest possible ambient temperature which the main body 1 of the fuel cell in a stop mode might encounter (for example, lower than 72% by weight when the lowest temperature is $-30°$ C.), no crystallization will occur when the fuel cell encounters the lowest ambient temperature while its operation is being stopped, resulting in that the occurrence of damages and deterioration of the function due to crystallization can be prevented effectively without heating during stopping of the operation of the fuel cell.

Embodiment 2

Figure 3:
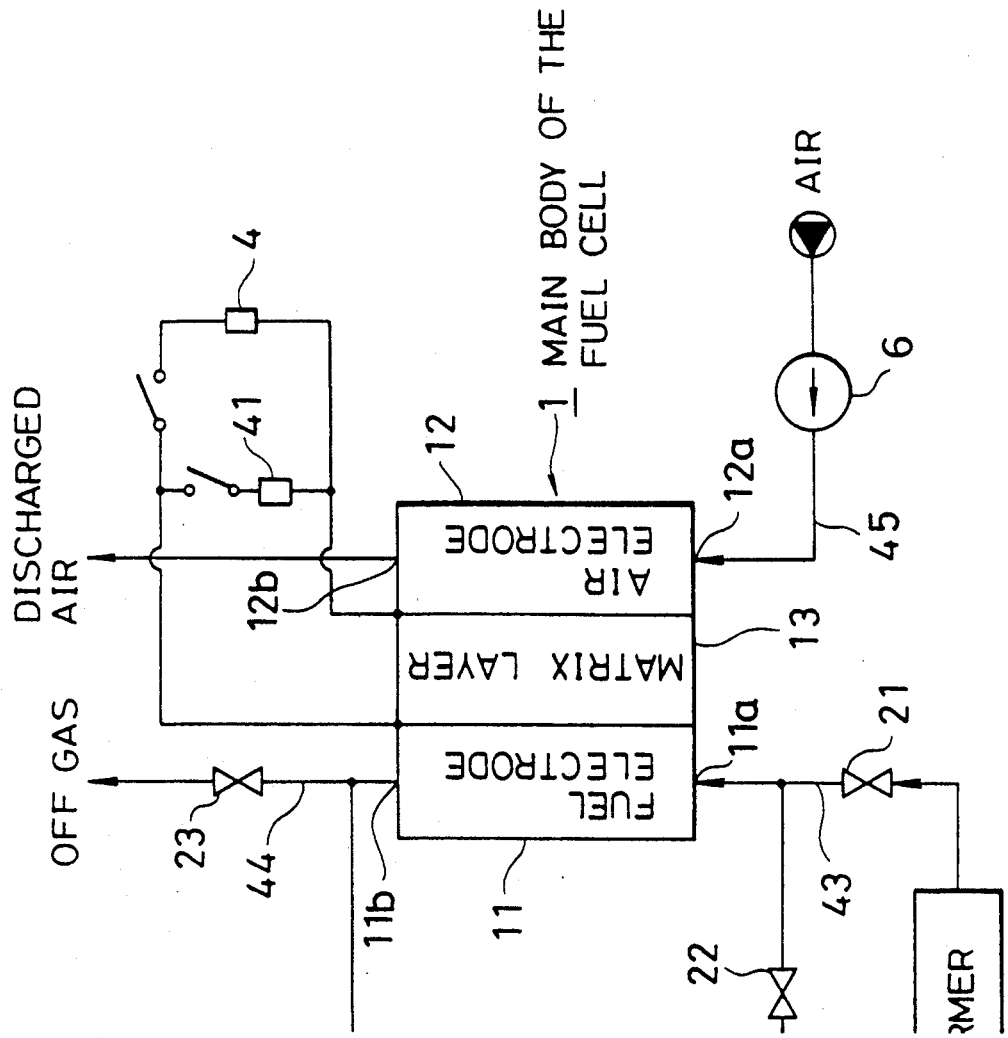
FIG. 3 is a block diagram showing a supply and discharge line for a reaction gas used in a fuel cell generator practicing the method of stopping an operation of fuel cell according to another embodiment of the present invention.

FIG. 3 is a block diagram of a supply and discharge line or system for a reaction gas used in a fuel cell generator practicing the method of stopping an operation of a fuel cell according to another embodiment of the present invention, and parts the same as those illustrated in FIG. 1 are indicated with the same numerals. In FIG. 3, reference numeral 1 denotes a main body of a phosphoric acid fuel cell illustrated schematically. The main body of the fuel cell includes a pair of electrodes, i.e., a fuel electrode 11 and an air electrode 12, and a matrix 13 which carries as impregnated therein an electrolyte. The fuel electrode 11 and the air electrode 12 sandwich the matrix 13 therebetween. The fuel electrode 11 has an inlet 11a and an outlet 11b for the supply and discharge, respectively, of a fuel gas which typically contains hydrogen as a combustible gas component. A fuel gas circulation blower 3 is connected to the main body 1 so as to connect the inlet and outlet and through a valve 22 arranged between the circulation blower 3 and the inlet 11a to constitute a fuel gas circulation line or system 2. In addition, a fuel gas supply line or system 43 for supplying the fuel gas to the fuel electrode 11 is provided. The fuel gas supply line or system 43 is constituted by a reformer 5 which is connected to the inlet side of the fuel electrode 11 through a valve 21. To the outlet side of the reformer 5 is connected a discharge line or system 44 for discharging an off gas which line includes a valve 23. The reformer 5 converts raw material composed of a raw fuel such as natural gas or methanol and water into a hydrogen-rich fuel gas, and when the fuel cell is operated, the reformer 5 supplies the fuel gas to the fuel electrode 11 in the main body 1 of the fuel cell by opening the valve 21. On the other hand, the air electrode 12 of the main body 1 of the fuel cell is provided with a reaction air supply and discharge line or system 45 for supplying air for reaction through an air blower 6. The air electrode 12 has an inlet 12a and an outlet 12b and air from the air blower 6 is introduced in the air electrode 12 through the inlet 12a and air after reaction is discharged to the atmospheric air through the outlet 12b. Furthermore, an electric discharge resistor 41 is connected to the outlet side of the main body 1 of the fuel cell through a switch 41a.

In the above-described construction, the valve 22 is closed and the circulation blower 3 is stopped during the power generation of the fuel cell, and the fuel gas is supplied to the fuel electrode 11 in the main body 1 of the fuel cell from the reformer 5 through the valve 21 while air is supplied to the air electrode 12 in the main body 1 of the fuel cell from the air blower 6, and as a result the fuel cell generates electric power and supplies electric power to a load 4, for example.

Next, explanation will be made on an operation of stopping the operation of the fuel cell, i.e., an operation of switching the state of the fuel cell from the above-described power generation mode to a stop mode. When the operation of the fuel cell is to be stopped, at first the load 4 outside is interrupted from the cell and then the valve 22 is opened and the circulation blower 3 is actuated to circulate the fuel gas in the fuel electrode 11 in the fuel gas circulation line or system 2. When, the electric discharge resistor 41 is switched on, electric current flows through the electric discharge resistor 41 so that the fuel cell comes into a state of power generation under a load of the resistor 41, resulting in that hydrogen, a reaction gas component in the fuel gas, and oxygen in the air supplied by the air blower 6 to the air electrode 12 are consumed as a result of electrochemical reaction therebetween and on the other hand, water is produced. In this state, phosphoric acid absorbs moisture in the same mechanism as in Embodiment 1 illustrated in FIG. 1 to thereby decrease the concentration of phosphoric acid.

Then, after lapse of a predetermined period of time, the valve 23 is closed to stop the discharge of the off gas to be discharged from the fuel electrode 11. In this state, the fuel gas flows in from the reformer 5 into the fuel gas circulation line or system 2 such that the amount of the fuel gas corresponds to that of hydrogen which reacted. Due to electrochemical reaction: $2H_2 + O_2 = 2H_2O$ upon the power generation, the pressure of the gas circulating in the fuel gas circulation line or system 2 after the reaction decreases relative to atmospheric pressure. As a result, the fuel gas is supplied from the reformer 5 at a flow rate corresponding to the decrease in pressure. Because they are not reactants, the water produced during the power generation and non-reactive components such as carbon dioxide contained in the fuel gas accumulate in the fuel gas circulation line or system 2, and the amount of the water produced and concentrations of the non-reactive components increase with lapse of time to thereby decrease the concentration of hydrogen in the fuel gas accordingly. Hence, the fuel gas in the fuel gas circulation line or system 2 is replaced by the non-reactive components contained in the fuel gas. In addition, the water produced is absorbed by phosphoric acid so that the concentration of phosphoric acid is decreased accordingly.

On the other hand, the amount of hydrogen consumed is proportional to the amount of electric current which flows in the electric discharge resistor. The amount of the electric current is determined depending on the voltage of the current generated by the fuel cell and the resistivity of the electric discharge resistor 41. Hence, the higher the resistivity of the resistor, the smaller is the amount of hydrogen consumed. As a result, it is possible to control reacting weight per unit time and hence calorific value so that if a cooling mechanism (not shown) for cooling the main body of the fuel cell is actuated, the heat generated can be removed with ease to thereby retain the temperature of the main body of the fuel cell at a temperature no higher than a predetermined allowable value. Furthermore, after the combustible gas in the fuel gas circulation line has been consumed as a result of reaction, no fuel gas flows in from the reformer so that the gas composition in the fuel gas circulation line or system at this point in time is composed of noncombustible gases such as carbon dioxide and the like derived from the fuel gas. If the circulation blower 3 is stopped and the valve 21 is closed at this point in time, the fuel electrode 12 is sealed with the inert gas or gases.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A method of stopping the operation of a phosphoric acid fuel cell having a matrix type main body including a fuel electrode and an air electrode and containing phosphoric acid as an electrolyte, a fuel gas containing a combustible component, a fuel gas circulation line for circulating the fuel gas and including the fuel electrode, a closable air inlet connected to the fuel gas circulation line for taking up air, a closable fuel gas supply and discharge line for supplying the fuel gas to the fuel electrode and discharging the fuel gas from the fuel electrode, and a reaction air supply and discharge line for supplying reaction air to the air electrode, said method comprising the steps of:
    interrupting a load of said fuel cell;
    supplying air from said air inlet while circulating gas in said fuel electrode to said fuel gas circulation line;
    decreasing a concentration of the electrolyte with water resulting from an electrode catalyst reaction occurring in said main body of said fuel cell;
    closing said fuel gas circulation line on its discharge side to consume said combustible component in said gas circulating in said fuel circulation line due to said electrode catalyst reaction; and
    decreasing the concentration of said combustible component in said fuel electrode and decreasing further the concentration of said electrolyte to predetermined respective levels.

2. A method of stopping an operation of a phosphoric acid fuel cell as claimed in claim 1, wherein said predetermined level of concentration of said electrolyte is in a range of from 91 to 63% by weight, and wherein said predetermined level is such that phosphoric acid will not crystallize at a predetermined minimum ambient temperature.

3. A method of stopping an operation of a phosphoric acid fuel cell as claimed in claim 1, wherein said predetermined level of concentration of said combustible component of said fuel gas is no higher than 4% by volume.

4. A method of stopping the operation of a phosphoric acid fuel cell having a matrix type main body including a fuel electrode and an air electrode and containing phosphoric acid as an electrolyte, a fuel gas containing a combustible component, a fuel gas circulation line for circulating the fuel gas and including the fuel electrode and a circulation blower, a closable fuel gas supply and discharge line for supplying the fuel gas to the fuel electrode and discharging the fuel gas from the fuel electrode, and a reaction air supply and discharge line for supplying reaction air to the air electrode, said method comprising the steps of:
    interrupting a load of said fuel cell and connecting a discharge resistor thereto;
    continuing a power generation reaction while circulating said fuel gas to be supplied to said fuel electrode through said fuel gas circulation line by said circulation blower;
    decreasing a concentration of the electrolyte with water resulting in said air electrode due to said power generation reaction;
    closing said fuel gas circulation line on its discharge side to consume said combustible component in said gas circulating in said fuel circulation line due to said electrode catalyst reaction; and
    decreasing the concentration of said combustible component in said fuel electrode and decreasing further the concentration of said electrolyte to predetermined respective levels.

5. A method of stopping an operation of a phosphoric acid fuel cell as claimed in claim 4, wherein said predetermined level of concentration of said electrolyte is in a range of from 91 to 63% by weight, and wherein said predetermined level is such that phosphoric acid will not crystallize at a predetermined minimum ambient temperature.

6. A method of stopping an operation of a phosphoric acid fuel cell as claimed in claim 4, wherein said predetermined level of concentration of said combustible component of said fuel gas is no higher than 4% by volume.

* * * * *